United States Patent [19]
Ogihara et al.

[11] Patent Number: 4,881,096
[45] Date of Patent: Nov. 14, 1989

[54] MOTOR-DRIVEN SHUTTER FOR CAMERA

[75] Inventors: Masuo Ogihara; Hiroyuki Ishida; Shinji Nagaoka; Youichi Seki; Shigeru Tagami; Hiroshi Yamazaki; Nobuo Shinozaki, all of Yotsukaido, Japan

[73] Assignee: Seikosha Co., Ltd., Tokyo, Japan

[21] Appl. No.: 15,169

[22] Filed: Feb. 17, 1987

[30] Foreign Application Priority Data

Feb. 28, 1986 [JP] Japan .................. 61-43230

[51] Int. Cl.$^4$ .......................... G03B 3/10; G03B 7/00; G03B 9/22
[52] U.S. Cl. .................................. 354/400; 354/439; 354/234.1
[58] Field of Search ............... 354/400, 402, 403, 404, 354/405, 408, 195.1, 234.1, 435, 439, 195.12

[56] References Cited

U.S. PATENT DOCUMENTS

| 3,274,914 | 9/1966 | Biedermann et al. | 354/408 X |
| 4,324,463 | 4/1982 | Lermann et al. | 354/408 |
| 4,336,988 | 6/1982 | Johnson | 354/195.12 |
| 4,508,442 | 4/1985 | Hirohata | 354/400 |
| 4,610,523 | 9/1986 | Tsuboi | 354/195.1 |
| 4,634,254 | 1/1987 | Ogihara et al. | 354/403 |
| 4,684,233 | 8/1987 | Kodaira et al. | 354/400 |
| 4,696,559 | 9/1987 | Kondo | 354/195.1 X |
| 4,728,979 | 3/1988 | Akitake et al. | 354/400 |
| 4,779,114 | 10/1988 | Kobayashi | 354/400 |

Primary Examiner—W. B. Perkey
Attorney, Agent, or Firm—Bruce L. Adams; Van C. Wilks

[57] ABSTRACT

A camera shutter has an automatic focusing lens operative when actuated to effect an automatic focusing operation. An actuating ring is normally placed in a non-operating region and momentarily shifted to an operating region during the automatic focusing operation. The actuating ring is sequentially displaceable in forward and reverse direction through the operating region to actuate the automatic focusing lens, and displaceable in the forward and reverse directions in the non-operating region without effecting actuation of the automatic focusing lens. A ratchet mechanism is coupled to the actuating ring for selectively locking and unlocking the actuating ring in the non-operating region in response to the displacement thereof in the forward and reverse directions. A bi-directionally rotatable stepping motor is connected to drive the actuating ring to displace the same in the forward and reverse directions.

17 Claims, 3 Drawing Sheets

MOTOR-DRIVEN SHUTTER FOR CAMERA

BACKGROUND OF THE INVENTION

1. Field of the Invention:

The present invention relates to a motor-driven shutter for use in a camera with automatic focusing and exposure control.

2. Description of the Prior Art:

Japanese Laid-Open Patent Publication No. 61-9631 discloses a shutter capable in combination with a single stepping motor for continuously effecting focusing operation, exposing operation according to the brightness of an object to be photographed, and returning operation. According to the disclosed shutter device, a range adjustment lever which is biased by a spring is held in abutment against a drive lever that is driven by the stepping motor, and the range adjustment lever is arrested in a focused position for thereby setting the objective lens in the focused position.

With this arrangement, the resilient force of the spring acting on the range adjustment lever is applied via the drive lever to the stepping motor. When the stepping motor is not in use, the motor has to hold the drive lever and other members in a standby position while resisting the spring force under the magnetic coupling force of the rotor and stator of the motor. In the event that the camera is subjected to a shock, the spring force and the magnetic coupling force are brought out of balance, shifting the stator and the rotor out of phase with each other, so that the shutter will not operate properly.

SUMMARY OF THE INVENTION

In view of the aforesaid drawbacks of the conventional shutter device, it is an object of the present invention to provide a motor-driven shutter for use in cameras which is capable of locking a range adjustment means without imposing any load on a motor means, for thereby preventing various problems for occurring due to a failure or malfunction of the motor means.

According to the present invention, there is provided a motor-driven shutter for use in a camera, including a drive member drivable by a motor means, a range adjustment means normally urged by a resilient member for movement with the drive member, a focus detecting means operable in coaction with the range adjustment means for producing a focusing signal, and a solenoid means de-energized in response to the focusing signal from the focusing detecting means for arresting the range adjustment means in a focused position. The range adjustment means includes a locking member lockable by the solenoid means in a standby position and a retracting member for unlocking the locking member to allow the solenoid means to arrest the range adjustment means in the focused position when the shutter starts to operate.

The above and other objects, features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENT

Figure 1:
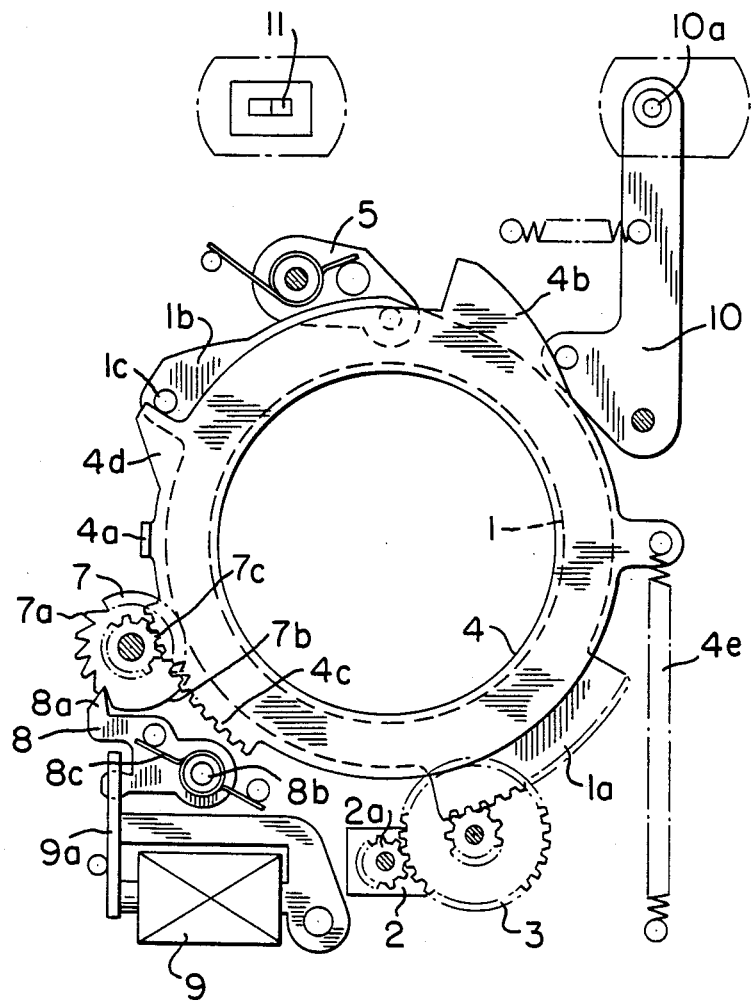
FIG. 1 is a front elevtional view of a solenoid-operated shutter according to the present invention.
Figure 3:
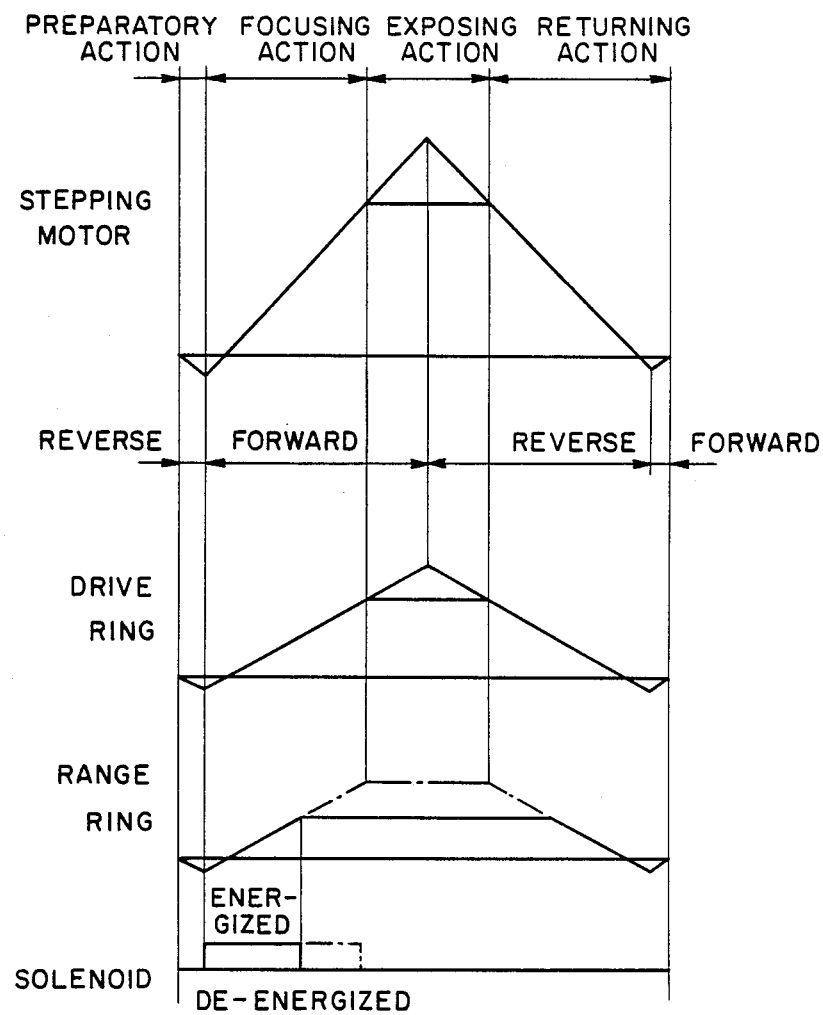
FIG. 3 is a timing chart of operation of various components of the shutter.

FIG. 1 shows a solenoid-operated shutter according to the present invention, in which the parts of the shutter are positioned before the shutter is released. A drive ring 1 is angularly movable around a lens aperture and has a sector gear 1a on its outer circumferential edge. The drive ring 1 is driven by a rotor gear 2a mounted on the shaft of a stepping motor 2 and meshing with an idler 3 which meshes with the sector gear 1a. The drive ring 1 is rotated in a non-operating region around the lens aperture selectively in opposite directions when the stepping motor 2 is reversed for preparatory action and rotated through an operating region in forward and reverse directions for focusing, exposing, and returning action (FIG. 3). The drive ring 1 also has a sector opening/closing cam 1b projecting radially outwardly from the circumferential edge thereof for opening and closing a sector (not shown) by acting on a sector opening/closing lever 5 after the driving ring 1 passes through a focusing operating region.

A range ring 4 is also disposed in concentric relation to the drive ring 1 for angular movement around the lens aperture to cause a lens driver 4a to move a lens (not shown) into a focused position. The range ring 4 has a cam 4b for scanning a light emitting element and a sector gear 4c meshing with a pinion 7c on a ratchet wheel 7. The range ring 4 is normally urged by a spring 4e in the forward direction to turn clockwise (FIG. 1) to cause a projection 4d to engage with a pin 1c on the drive ring 1 so that the range ring 4 is interlocked to the drive ring 1 for the forward angular movement with the drive ring 1.

The ratchet wheel 7 and the range ring 4 jointly constitute a range adjustment means. The ratchet wheel 7 serving as a locking member has a plurality of teeth 7a on its outer circumferential edge for determining the focused position. The ratchet wheel 7 also has a tooth-free larger-diameter sector or cam face 7b positioned as a retracting or unlocking member circumferentially adjacent to the first tooth 7a for retracting a finger 8a of an engagement lever or pawl 8 into a disengaging position in response to initial reverse angular movement of the range ring 4.

The engagement lever 8 is angularly movably supported on a pin 8b on the base plate and normally urged by a spring 8c to turn clockwise about the pin 8b. The engagement lever 8 is coupled to an iron piece 9a which is magnetically attractable to a solenoid or electromagnet 9 when it is energized. When the solenoid 9 is de-energized, the engagement lever 8 is turned clockwise under the resiliency of the spring 8c to bring the finger 8a into engagement with one of the teeth 7a of the ratchet wheel 7 for thereby holding the ratchet wheel 7 to arrest the range ring 4 in the focused position.

A lever 10 is guided by the cam 4b of the range ring 4 for angular movement for scanning the light-emitting element 10a mounted on the distal end of the lever 10. A two-component sensor 11 receives a pulse of light emitted by the light-emitting element 10a and reflected by an object to be photographed and, when output levels from the two sensor areas are equalized, produces a focusing signal to de-energize the solenoid 9.

Operation of the solenoid-operated shutter thus constructed will be described below.

Before the shutter is released as shown in FIG. 1, the solenoid 9 is de-energized and the engagement lever 8 is biased by the spring 8c to turn clockwise to bring the finger 8a into engagement with the first tooth 7a of the ratchet wheel 7, thereby keeping the range ring 4 from rotation. Thus, the drive ring 1 is not subjected to the resilient force of the spring 4e through the range ring 4, and hence the rotor and stator of the stepping motor 2 properly remain in magnetically coupled state.

Figure 2A:
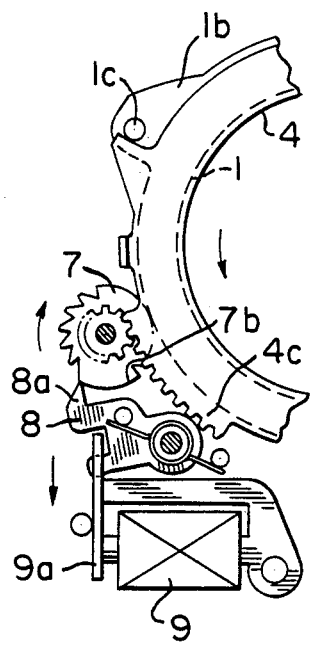
FIG. 2(a) and 2(b) are fragmentary front elevational views showing operation of the solenoid-operated shutter.

In response to depression of shutter release button, a main switch is turned on to rotate the stepping motor 2 in the reverse direction for preparatory action (FIG. 3). The drive ring 1 and the range ring 4 are now rotated counterclockwise (FIG. 1), whereupon the ratchet wheel 7 in mesh with the range ring 4 is turned clockwise to disengage the finger 8a of the engagement lever 8 from the tooth 8a and to rest the finger 8a onto the outer circumferential of the largerdiameter sector 7b (FIG. 2(a)).

Figure 2B:
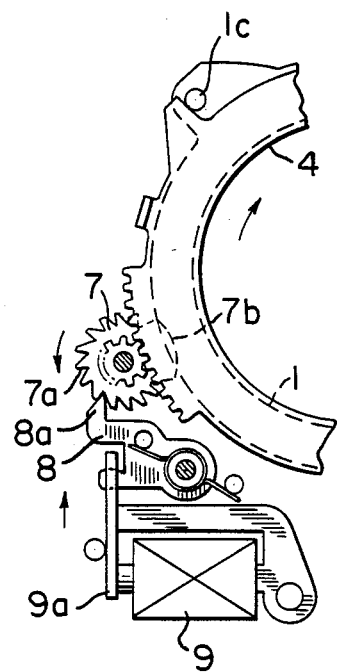

The above preparatory action is followed by rotation of the stepping motor 2 in the forward direction for focusing action. At the same time, the solenoid 9 is energized to attract the iron piece 9a, thereby holding the engagement lever 8 at the larger-diameter sector 7b of the ratchet wheel 7. As the range ring 4 is angularly moved, the scanning lever 10 starts its clockwise angular movement by being guided by the cam 4b, allowing a pulse of light from the light-emitting element 10a to be applied to the object. The two-component sensor 11 then detects reflected light from the object. When outputs from the two sensor areas of the sensor 11 coincide with each other, the sensor 11 generates a focusing signal to display range information in a viewfinder (not shown) and de-energize the solenoid 9. The engagement lever 8 is now turned clockwise under the force of the spring 8c into engagement with the ratchet wheel 7, which then stops the range ring 4 to position the objective lens in the focused position (FIG. 2(b)).

Continued forward rotation of the stepping motor 2 causes the drive ring 1 to turn clockwise after the lens has been focused, thereby enabling the sector opening/closing cam 1b to turn the sector opening/closing lever 5 counterclockwise for opening the sector (not shown) sector.

When a number of pulses as calculated according to the detected object brightness are produced, a control circuit (not shown) reverses the phase of the pulses. After the sector has been opened to the degree dependent on the object brightness, the control circuit reverses the stepping motor 2 (FIG. 3) to return the drive ring 1 counterclockwise (FIG. 1) while closing the sector until the parts are moved back to the initial position of FIG. 1.

In the illustrated embodiment, the stepping motor 2 is reversed slightly excessively and then rotated forwardly in the returning action (FIG. 3) for return to the standby position. The ratchet wheel 7 is therefore rotated slightly excessively clockwise by the drive ring 1 and the range ring 4 to place the finger 8a of the engagement lever 8 onto the larger-diameter sector 7b, and then is rotated counterclockwise to bring the finger 8a into engagement with the first tooth 7a, thus accurately positioning the range ring 4.

While the ratchet wheel 7 meshing with the range ring 4 has the larger-diameter sector 7b for retracting the engagement lever 8, the range ring 4 may be provided with such a larger-diameter sector and teeth instead.

Therefore, when the camera is not in use, the stepping motor 2 is not subjected to the resilient force from the spring 4e since the drive ring 1 is locked against rotation by the ratchet wheel 7 engaged by the engagement lever 8. The stepping motor 2 is thus not subjected to undue stresses and is prevented from malfunctioning. Consequently, focusing failures and exposure adjustment failures which would otherwise arise from malfunctioning of the stepping motor are prevented from occurring.

Although a certain preferred embodiment has been shown and described, it should be understood that many changes and modifications may be made therein without departing from the scope of the appended claims.

What is claimed is:

1. A shutter device for use in a camera, comprising:
   motor means;
   a drive member drivable by said motor means;
   range adjustment means normally urged by a resilient member for movement with said drive member;
   focus detecting means operable in coaction with said range adjustment means for producing a focusing signal;
   solenoid means de-energized in response to the focusing signal from said focus detecting means for placing said range adjustment means in a focused position;
   said range adjustment means including a locking member lockable by said solenoid means in a standby position, and a retracting member for unlocking said locking member to allow said solenoid means to place said range adjustment means in the focused position when the shutter device starts to operate.

2. A shutter device according to claim 1; wherein said range adjustment means further includes a range ring, said locking member comprises a ratchet wheel having teeth, said retracting member comprises a tooth-free larger-diameter sector of said ratchet wheel, and said solenoid means comprises a solenoid and an engagement lever actuatable by said solenoid for engagigng with said teeth of the ratchet wheel.

3. A shutter device according to claim 2; further including a pinion disposed on said ratchet wheel, and wherein said range ring has a sector gear meshing with said pinion.

4. In a camera shutter having automatic focusing means operative when actuated to effect an automatic focusing operation: actuating means normally positioned in a non-operating region and momentarily shifted to an operating region during the automatic focusing operation, the actuating means being sequentially displaceable in forward and reverse directions through the operating region to actuate the automatic focusing means, and being displaceable in the forward and reverse directions in the non-operating region without effecting actuation of the automatic focusing means; locking and unlocking means for selectively locking and unlocking the actuating means in the non-operating region in response to the displacement thereof in the forward and reverse directions; and electromagnetic driving means for driving the actuating means to displace the same in the forward and reverse directions.

5. A camera shutter according to claim 4; wherein the locking and unlocking means comprises engaging and disengaging means engageable with the actuating means when the actuating means is displaced in the forward direction to lock the actuating means, and disengageable from the actuating means when the actuating means is displaced in the reverse direction to unlock the actuating means.

6. A camera shutter according to claim 5; wherein the magnetic driving means includes means for displacing the actuating means in the reverse direction in the non-operating region to effect the unlocking of the actuating means, thereafter displacing the actuating means in the forward direction from the non-operating region through the operating region to cause the actuating means to actuate the automatic focusing means, then displacing the actuating means in the reverse direction to return the actuating means through the operating region to the non-operating region, and lastly displacing the actuating means in the forward direction in the non-operating region to effect the locking of the actuating means.

7. A camera shutter according to claim 5; wherein the engaging and disengaging means comprises a ratchet mechanism having a ratchet wheel rotatably coupled to the actuating means, and a pawl engageable with the ratchet wheel for blocking the rotation of the ratchet wheel.

8. A camera shutter according to claim 7; wherein the ratchet wheel has a ratchet tooth engageable with the pawl to lock the actuating means, and an adjacent cam face on which rests the pawl to unlock the actuating means.

9. A camera shutter according to claim 8; wherein the ratchet wheel has a plurality of ratchet teeth selectively engageable with the pawl to arrest the actuating means when the automatic focusing operation is completed during the displacement thereof in the forward direction through the operating region.

10. A camera shutter according to claim 9; wherein the ratchet mechanism includes holding and releasing means for holding the pawl away from the ratchet teeth during the displacement of the actuating means in the forward direction through the operating region and for releasing the pawl when the actuating means completes the automatic focusing operation to allow the pawl to engage with one of the ratchet teeth.

11. A camera shutter according to claim 10; wherein the holding and releasing means includes a solenoid operative when energized for holding the pawl and operative when de-energized for releasing the pawl.

12. A camera shutter according to claim 4; including means for normally urging the actuating means in the forward direction.

13. A camera shutter according to claim 4; wherein the electromagnetic driving means comprises a stepping motor rotatable in forward and reverse directions.

14. A camera shutter according to claim 4; wherein the actuating means comprises a first actuating member driven by the electromagnetic driving means to undergo displacement in the forward and reverse directions, and a second actuating member interlocked to the first actuating member for displacement therewith to actuate the automatic focusing means.

15. A camera shutter according to claim 14; wherein the actuating means includes means operative when the second actuating member completes the automatic focusing operation during the displacement thereof in the forward direction for arresting the second actuating member to thereby release the interlock between the first and second actuating members to allow the first actuating member to move further in the forward direction.

16. A camera shutter according to claim 15; including automatic exposure means actuated by the first actuating member during the displacement thereof in the operating region for effecting an automatic exposure operation.

17. A camera shutter according to claim 14; wherein the first and second actuating members comprise a pair of concentric rings disposed around a lens aperture.

* * * * *